June 6, 1961  L. W. NELSON  2,987,595
CONTROL APPARATUS
Filed March 3, 1959

INVENTOR.
LORNE W. NELSON
BY Clyde C. Blinn
ATTORNEY

2,987,595
CONTROL APPARATUS
Lorne W. Nelson, Minneapolis, Minn., assignor to Minneapolis-Honeywell Regulator Company, Minneapolis, Minn., a corporation of Delaware
Filed Mar. 3, 1959, Ser. No. 796,799
7 Claims. (Cl. 200—122)

The present invention is concerned with a space thermostat; in particular, a thermostat having an air temperature responsive portion and a radiant heat responsive portion. The radiant heat responsive portion is connected to reset the control point of the air temperature responsive portion depending upon the change in radiant energy as sensed by the radiant portion.

As air conditioning systems become more and more elaborate to provide better heating and cooling, a need continually exists for a more refined thermostat for controlling the equipment. To properly control heating and cooling equipment to maintain comfort in a space, a thermostat must not only respond to the temperature of the air in the space, but the thermostat should be affected in some manner by the outdoor temperature and weather conditions as such conditions greatly affect the desired temperature of the air in a space.

There are temperature control systems available which contain air temperature responsive thermostats for controlling air conditioning apparatus and outdoor temperature responsive thermostats for re-adjusting the control point of the indoor space thermostat depending upon outdoor weather conditions. Such systems not only involve two thermostats, but the installation costs greatly exceed the cost of installation when only an indoor thermostat is used.

The present invention makes use of a thermostat which can be mounted on a wall inside a space to respond to the indoor air temperature and to be adjusted depending upon the indoor surface temperatures as affected by the outdoor temperature. The thermostat comprises a first responsive means which is responsive to the temperature of the air in the space for controlling a condition responsive apparatus. A second temperature responsive means is adapted to re-adjust the control point of the first responsive means. The second responsive means is responsive to the amount of heat radiated to and from the surrounding objects or walls of the space. As the outdoor temperature drops and the outdoor walls of the space become colder, or as the outdoor temperature rises and the outdoor walls of the space become warmer, the second responsive means senses the presence of the cold walls, and the first responsive means is reset to maintain a different space temperature to increase the comfort of the occupants in the space.

An object of the present invention is to provide an improved space thermostat.

Another object of the present invention is to provide a space thermostat having a first portion responsive to the temperature of the air in the space and a second portion for resetting the control point of the first portion as the amount of heat radiation affecting the second portion changes.

These and other objects of the present invention will become apparent upon a study of the drawing in which.

Figure 1:
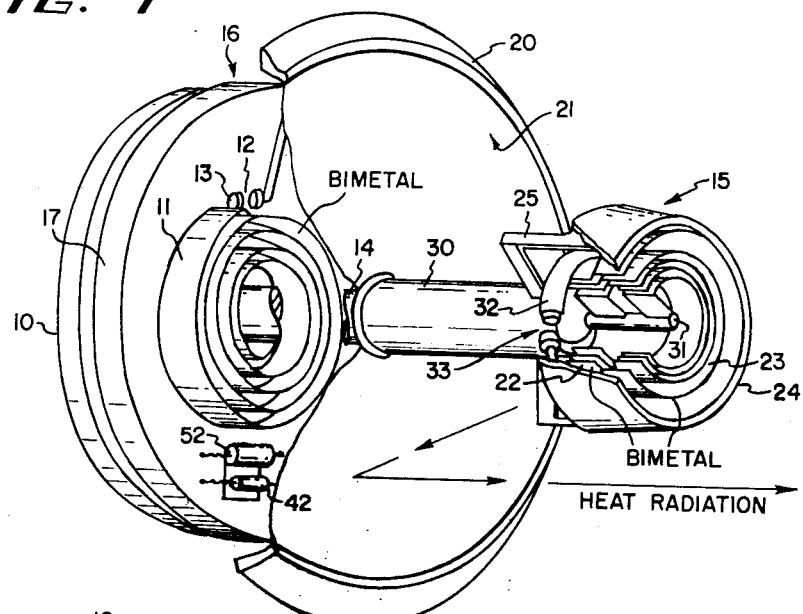
FIGURE 1 is a schematic view of a space thermostat.

Referring to FIGURE 1, a base 10 is adapted to be mounted on a wall in a space in which the temperature is being controlled by a temperature changing apparatus. A thermostat base 17 is attached to base 10 when the thermostat is mounted on the wall. The thermostat comprises a first temperature responsive portion 16 having a bimetal 11 mounted on base 17. A switch 12 has a movable contact 13 connected to one end of bimetal 11; so that, as the temperature of the air in the space drops and the temperature of element 11 decreases, movable contact 13 is moved to the right to close switch 12. A post 14 extending from the center of base 17 supports a second portion 15 of the thermostat which is responsive to a loss or gain of heat by radiation. A reflector 20 surrounding post 14 forms a cover for the first portion of the thermostat. The cover is so located that air is able to circulate from the space past element 11 by convection. A front surface 21 of reflector and cover 20 has a curved shape; so that heat can be radiated to or from portion 15. The selection of the shape of front surface 21 would obviously depend upon the desired pattern of heat radiation from the second portion 15. As shown the heat is radiated in a direction to the front of base 10.

The second portion 15 comprises two temperature responsive elements or bimetals 22 and 23. One extremity of bimetal 23 is connected to the outer housing 24 which is fixed by a bracket 25 to the sleeve 30 mounted on post 14. The other extremity of bimetal 23 is attached to a floating shaft 31. One extremity of element 22 is connected to shaft 31, and the other extremity is connected to a movable contact 32 which forms part of switch 33. As the ambient temperature of portion 15 changes, elements 22 and 23 have no affect upon switch 33. The elements are connected in opposition. Since element 22 is closely associated with the reflecting surface 21, heat radiates from element 22 to cold objects in front of the thermostat. When element 22 loses heat by radiation and the temperature of element 22 drops a predetermined amount, switch 33 closes.

For explanation purposes, the thermostat is shown connected to a typical heating system. Switch 12 is connected in a series circuit from a source of power having a secondary 40. The circuit can be traced as follows: from one extremity of secondary 40, a conductor 41, element 11, switch 12, a heater 42, conductor 43, a conventional temperature limit control 44, a fuel valve 45, a conductor 50, and back to secondary 40. Heater 42 provides "false" or "artificial" heat to element 11 each time switch 12 closes for "heat anticipation" purposes to increase the cycling rate of the first portion of the thermostat. The use of artificial heat to change the control point of a thermostat is old.

The second portion of the thermostat comprises elements 22 and 23. Switch 33 is connected to secondary 40 by a circuit traced as follows: from one extremity of secondary 40, a conductor 51, a conductor 53, element 22, switch 33, a heater 54, a conductor 55, an adjustable resistance 56, and back to the secondary 40. A heater 52 thermally associated with element 11 is connected between conductors 53 and 55. Heater 54 is not shown in FIGURE 1 as element 22 actually can have sufficient resistance to provide adequate heat; however, for explanation purposes heater 54 is shown to heat element 22 each time switch 33 closes. Such also could be the case with heater 42 as it is obvious to one skilled in the art that false heat can be applied to a thermostat by using the bimetal as a resistance heater.

When switch 33 closes, heater 52 is effectively de-energized to remove the false heat from element 11 since a much lower resistance circuit is provided through the parallel circuit including switch 33. When element 11 is calibrated to maintain a certain temperature in the space in which the thermostat is mounted, valve 45 will supply fuel to furnace 60 and heat will be supplied to the duct by the fan 61. The temperature selected by the calibration of the first portion of the thermostat or element 11 would maintain the air temperature at some predetermined value. When the temperature of the walls in the space such as a window or a brick wall drops as a result of a decrease in the outdoor temperature, the indoor air temperature should be increased to maintain adequate comfort. Element 22 will lose heat by radiation to the cold surfaces through reflecting surface 21. As the element loses heat and cools down, switch 33 is closed to shunt heater 52 or remove the false heat from first portion 16 of the thermostat to raise the control point of portion 16. The effect of the false heat is to make the bimetal 11 respond differently for the same surrounding temperature conditions; therefore, the control point of a thermostat can be lowered or raised by adding or removing false heat, respectively. The colder the outdoors and the more heat radiated from element 22, the higher the control point of the first portion of the thermostat or element 11 is raised to increase the space air temperature. As switch 33 closes upon the decrease of the temperature of element 22, heater 54 is energized to raise the temperature of element 22 to restore it to ambient temperature. Switch 33 will cycle depending upon the degree of heat radiation from element 22, and the current to heater 52 is a time integrated signal proportional to the heat loss of thermostat 15. When element 22 loses heat to close switch 33, heat is immediately applied to the element by heater 54 or by the heat formed by the current passing through the element 22 as in the case of FIGURE 1 to again open contacts 33. When switch 33 closes upon a change in the temperature of element 22, the normal temperature of element 22 is re-established. As the ambient air temperature changes, the amount of heat needed, to maintain the temperature of element 22 constant or supply the radiant loss due to the cold wall, will change. In order to compensate for the change in ambient, the effect of the ambient upon elements 22 and 23 cancel one another; so that, the second portion of the thermostat has an output only responsive to the radiation of heat to the remote objects or cold outer wall. The output of thermostat 15 is a signal proportional to the power or heat needed to bring the temperature of element back to the normal or ambient temperature. Switch 33 closes a certain percent of the time depending upon the amount of heat lost by element 22. The output is not affected in any appreciable manner by the ambient air flow across elements 22 and 23 as the elements are connected to balance each other.

Such a thermostat could be made very compact, and the conventional single element thermostats which only respond to air temperature could be easily replaced by the present invention to provide an improved temperature control. The replacement of this thermostat with the conventional thermostat requires practically no work or change in the system.

Operation

In order to maintain human comfort in a space the correct balance of heat loss of the human body must be attained. The heat loss of the human body is made up of two parts. The first part depends upon the radiation to surrounding surfaces or objects. The second part depends upon the heat loss due to convection losses. To be comfortable, the human body must have a predetermined heat loss which is made up of the three parts. The heat loss depends upon the body metabolism rate for any particular type of activity the person is then engaged in doing. Let us assume that the loss of heat of the human body for one particular activity is approximately 400 B.t.u.'s per hour. If 200 of the B.t.u.'s of heat are lost by radiation to cold walls and 100 B.t.u.'s of heat are lost by evaporation, the remaining 100 B.t.u.'s of heat must be lost by convection to have an equilibrium balance in the human body for comfort. Should the temperature of the surrounding walls of the space decrease to increase the radiation loss and thus the 200 B.t.u.'s figure, the total heat loss of the human body would then be increased. The person would then feel cold, and in order to restore comfort, the ambient air temperature would have to be increased to decrease the body heat lost by convection. The present thermostat responds to the temperature of the surrounding object in the same manner that the human body does, and as the radiation to the surrounding bodies increases, the ambient air temperature is increased to offset the increase in heat loss due to the radiation.

Figure 2:
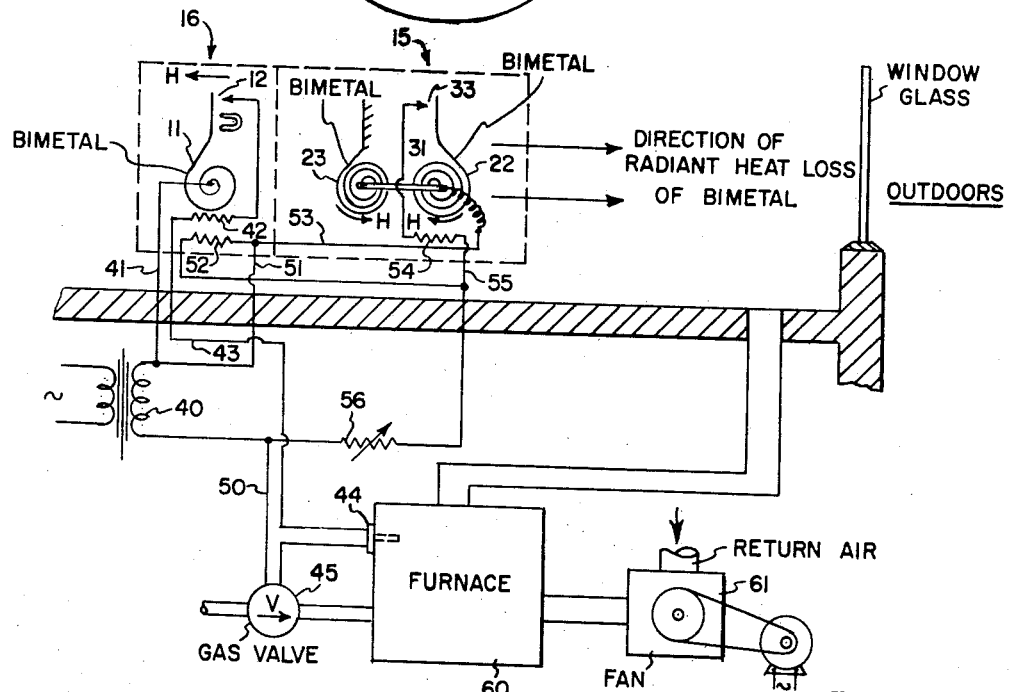
FIGURE 2 is a schematic diagram showing the improved thermostat and one manner of connecting the thermostat to a temperature conditioning apparatus.

The operation of the thermostat is explained in connection with FIGURE 2 as applied to a heating apparatus. The first portion 16 of the thermostat which is responsive to the air temperature in the space closes switch 12 when the temperature drops below some predetermined control point temperature. When switch 12 closes, valve 45 is energized and heat is supplied to the space. At the same time heater 42 is energized to apply false heat to the thermostat 16 for "heat anticipation" purposes. The second portion of the thermostat is responsive to the amount of heat lost by radiation. As the heat radiates from element 22 by means of the reflecting surface 21, the amount of heat from heater 52 changes as switch 33 will be closed a greater percent of the time. The lower the indoor wall temperature the greater the amount of heat radiation from element 22. When switch 33 is closed heater 54 will reheat element 22 to cause switch to open. The operation of switch 33 restores the temperature of element 22 to normal, and a cyclic energization of heater 52 produces a signal to element 11 which is a time integrated function of the radiation loss of thermostat 15. The heat of heater 52 resets the control point of thermostat 16 to increase the space air temperature when the temperature of the wall surface and other surrounding objects decreases.

As the ambient air temperature in the space changes, the temperature of the ambient air will affect both bimetals 22 and 23 equally, and since they are connected in opposition, the ambient air temperature has no effect upon the radiation responsive portion 15. The amount of reset can be adjusted by resistor 56; so that, the radiation has more effect upon the maintained space air temperature.

The invention has been explained in one manner and associated with one particular type of conditioning apparatus; however, the applicant intends that his invention only be limited by the scope of the appended claims in which I claim:

1. In a space thermostat, a base adapted to be mounted on a wall, a first temperature responsive means adapted to control a temperature changing apparatus for changing the temperature of the space, said first responsive means being mounted on said base for sensing the space temperature as the air of the space circulates around said responsive means by convection, reflector means attached to said base and forming a cover to house said first responsive means, a second temperature responsive means mounted substantially in a focal point of said reflector so that heat from said second responsive means can be reflected away from the thermostat to a cold body away from the mentioned wall, a source of power, a electrical heater thermally associated with said first temperature responsive means, said second temperature responsive means comprising, a switch, a pair of bimetallic elements connected in opposition to control said switch, said bimetal elements being equally effected by ambient air temperature so that a change in the temperature of the ambient air has no effect upon said switch, first circuit connection means connecting said source of power to said switch, second circuit connection means connecting said heater in parallel with said switch, one of said bimetal elements being located near the focal point of said reflector whereby heat from said one bimetal element is transmitted in a direction away from the wall, said first circuit connection means including said one bimetal element whereby the current flowing in said element when said switch is closed reheats said one element to re-establish the temperature of said one element to said ambient temperature, said heater having an output to reset said first responsive means proportional to the amount of heat required to re-establish the temperature of said one element to said ambient temperature.

2. In a space thermostat, a base adapted to be mounted on a wall in a room in which the space temperature is being maintained by a temperature changing apparatus, first temperature responsive means mounted on said base and adapted to control the changing apparatus, said responsive means being responsive to the temperature of the air in the room, a cover attached to said base for reducing the heat loss of said responsive means by radiation, a second temperature responsive means mounted as a part of said base on a side of said cover opposite said base, said cover forming a reflective surface whereby radiated heat being reflected from said surface to surrounding objects is effective to change an output of said second responsive means, means for connecting said output of the second responsive means to said first responsive means whereby the control point of said first responsive means is changed to reset the temperature of the space, said second responsive means comprising a first element responsive to the effect of said radiated heat and to room air temperature, and a second element connected in opposition to said first element, said second element being responsive to room air temperature and not to the effect of said radiated heat so that changes in the room air temperature are compensated for and said output of the second responsive means is only indicative of the temperature of objects remote from the thermostat as effected by the amount of heat radiation to the objects.

3. A thermostat comprising, a first temperature responsive means responsive to air temperature, reset means for resetting the control point of said first means, a second temperature responsive means responsive to the amount of heat radiated by said second means, said second responsive means comprising, third and a fourth temperature responsive means connected in opposition whereby an output resulting from the combined effects of said third and fourth responsive means is not changed by any change in the temperature of the ambient air, switch means connected to said third and fourth means, said switch means is opened when a predetermined deviation between the temperature of said third and fourth responsive means exists, circuit means comprising said third responsive means as a heater for connecting said switch and a source of power to said reset means so that when said switch closes said reset means and said heater are energized thereby the control point of said first responsive means is reset and said third responsive means is heated until said switch opens, and reflector means for reflecting heat from said third responsive means to cold bodies surrounding the thermostat whereby said third responsive means loses heat until said switch closes to energize said heater to produce a cyclic operation of said switch depending upon the rate of heat loss of said third responsive means.

4. A thermostat comprising, a first temperature responsive means responsive to space air temperature, reset means for resetting the control point of said first means, a second temperature responsive means responsive to the amount of heat radiation transfer by said second means, means connecting said second responsive means to said reset means said second responsive means comprising, third and a fourth temperature responsive means connected in opposition whereby an output resulting from the combined effects of said third and fourth responsive means is zero regardless of the temperature of the ambient air, said third responsive means being effected by the transfer of heat by radiation, switch means connected to said third and fourth means, said switch means is operated when a deviation between the temperature of said third and fourth responsive means exists as a result of radiation, circuit means for connecting said switch and a source of power to said reset means so that when said switch operates the control point of said first responsive means is reset, means for overcoming said deviation in temperature when said switch operates to produce a cyclic operation of said switch means proportional to the effect of radiation, and reflector means for transferring heat to effect the temperature of said third responsive means.

5. In a radiant energy responsive device, first responsive means responsive to ambient air temperature as effected by normal convection, said first responsive means being shielded to reduce its heat loss by radiation, second responsive means responsive to ambient air temperature and to the change in temperature as effected by heat loss due to radiation, switch means, means connecting said first and second means in opposition to said switch means whereby upon a predetermined deviation in temperature of said first and second means due to radiation said switch is operated, means thermally associated with said second responsive means for restoring the temperature of said second means to the ambient temperature when said switch is operated, and means adapted to respond to the quantity of heat necessary to restore said second means to said ambient temperature.

6. In a radiant energy responsive device, first responsive means responsive to ambient air temperature as effected by normal connection, said first responsive means being substantially uneffected by heat loss due to radiation second responsive means responsive to ambient air temperature and by the reduction in temperature as effected by heat loss due to radiation, switch means, means connecting said first and second means in opposition to said switch means whereby upon a reduction in temperature of said second means due to radiation said switch is operated, said switch being uneffected by changes in air temperature, heating means thermally associated with said second responsive means for restoring the temperature of said second means to the ambient temperature, electrical means comprising said switch for energizing said heating means, and means responsive to the quantity of heat necessary to maintain said second means at said ambient temperature.

7. A thermostat comprising, a first temperature responsive means responsive to space air temperature, reset means for resetting the control point of said first means, a second temperature responsive means responsive to the amount of heat radiation transfer by said second means, means connecting said second responsive means to said reset means said second responsive means comprising, third and fourth temperature responsive means connected in opposition whereby an output resulting from the combined effects of said third and fourth responsive means is zero regardless of the temperature of the ambient air, said third responsive means being effected by the transfer of heat by radiation, switch means connected to said third and fourth means, said switch means is operated when a deviation between the temperature of said third and fourth responsive means exists as a result of radiation, circuit means for connecting said switch and a source of power to said reset means so that when said switch operates the control point of said first responsive means is reset, and means for overcoming said deviation in temperature when said switch operates to produce a cyclic operation of said switch means proportional to the effect of radiation.

References Cited in the file of this patent

UNITED STATES PATENTS

| | | |
|---|---|---|
| 1,641,170 | Karlson | Sept. 6, 1927 |
| 1,885,053 | Slough | Oct. 25, 1932 |
| 2,176,001 | Jennings | Oct. 10, 1939 |
| 2,564,120 | McClean | Aug. 14, 1951 |
| 2,640,649 | Rusler | June 2, 1953 |
| 2,706,229 | Buske | Apr. 12, 1955 |
| 2,835,779 | Kazan | May 20, 1958 |
| 2,847,536 | Bishop | Aug. 12, 1958 |